Feb. 22, 1949.  F. E. ZEHRING  2,462,589
DIVIDER SETTING MICROMETER
Filed Jan. 17, 1945
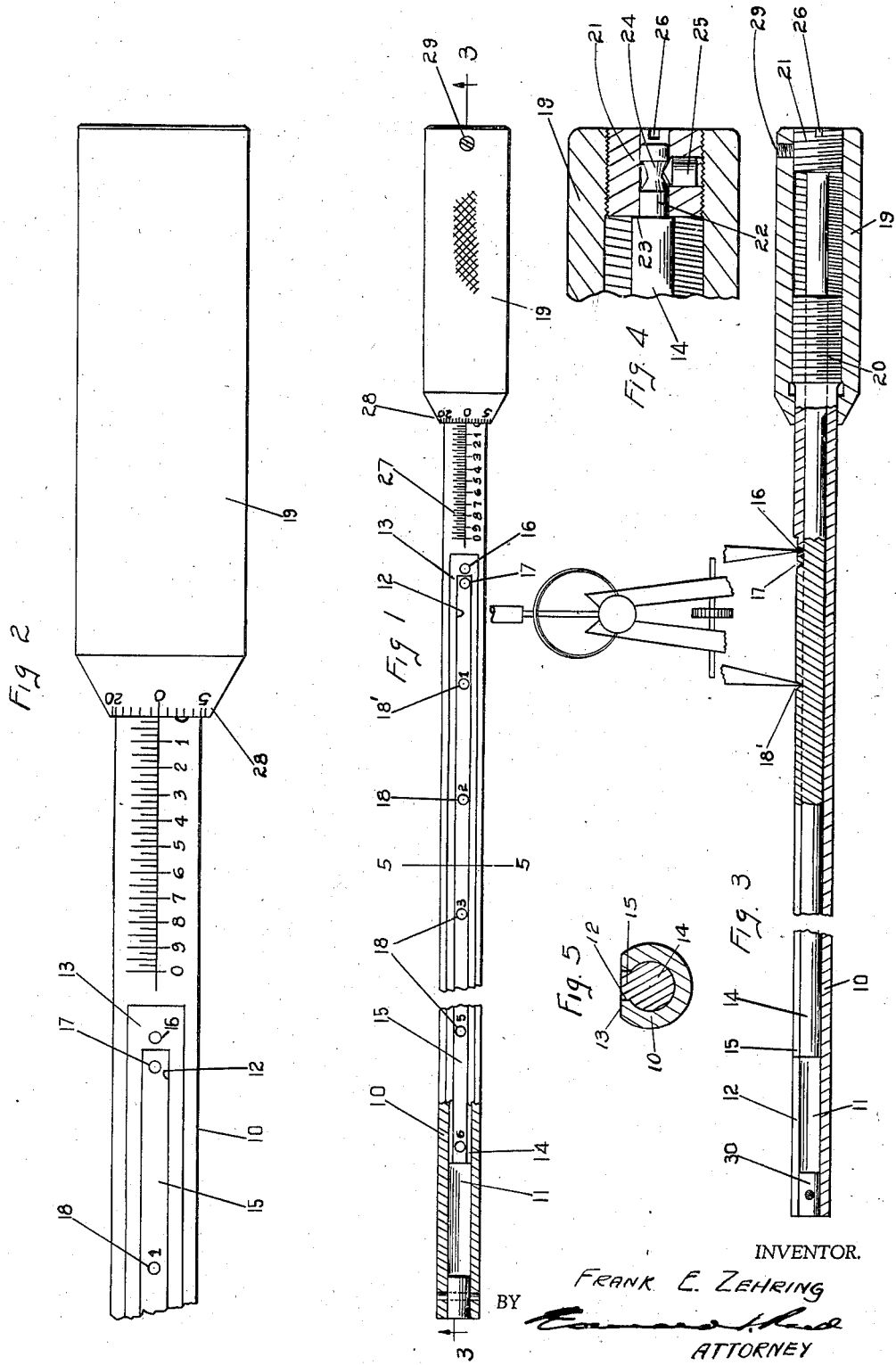
INVENTOR.
FRANK E. ZEHRING Patented Feb. 22, 1949

2,462,589

UNITED STATES PATENT OFFICE 2,462,589

DIVIDER SETTING MICROMETER

Frank E. Zehring, Dayton, Ohio

Application January 17, 1945, Serial No. 573,258

7 Claims. (Cl. 33—164)

This invention relates to a micrometer and more particularly to a micrometer, or similar device, adapted to accurately determine the spacing of the points of a divider or the like.

One object of the invention is to provide a micrometer by means of which the points of a divider may be easily and accurately adjusted to a selected measurement.

A further object of the invention is to provide a micrometer by means of which the spacing of the points of a divider may be quickly and accurately determined in accordance with very fine units of measurement.

A further object of the invention is to provide such a micrometer in which the relatively movable measuring elements are provided with means whereby the respective points of a divider may be quickly and accurately positioned with relation thereto after said elements have been adjusted to a selected measurement.

A further object of the invention is to provide a micrometer having simple and efficient means for relatively adjusting the distance between predetermined points thereon.

A further object of the invention is to provide a micrometer which is adjustable to take up any lost motion which may develop between the adjusting device and the movable measuring element.

A further object of the invention is to provide such a micrometer which is of simple construction and can be produced at a low cost.

Other objects of the invention may appear as the device is described in detail.

In the accompanying drawings Fig. 1 is a plan view, partly broken away, of a micrometer embodying my invention; Fig. 2 is an enlarged plan view of a portion of such a micrometer; Fig. 3 is a longitudinal section taken on the line 3—3 of Fig. 1; Fig. 4 is a sectional detail view showing the adjustable connection between the adjusting device and the movable member; and Fig. 5 is a section taken on the line 5—5 of Fig. 1.

In these drawings I have illustrated a preferred embodiment of my invention, which comprises a stationary element, a movable element connected with said stationary element for adjustment lengthwise thereof, said elements having means whereby the points of a divider may be accurately positioned at predetermined points on the respective elements, and means for adjusting said movable element and for indicating the distance between said positioning points in all positions of adjustment, whereby said positioning points may be spaced a selected distance one from the other and the divider then adjusted by bringing the points thereof into simultaneous engagement with the respective positioning points on said elements. The invention is designed primarily for use with dividers but it may be used, with or without modification, with other devices capable of being adjusted in a similar manner, and the term "divider" as herein used, is intended to include any such device.

In the embodiment here illustrated the stationary element is in the form of an elongate tubular member, 10, the bore 11 of which constitutes a guideway for the movable element. The tubular element is provided in its upper side with a longitudinal slot 12 to provide the guideway with an open portion the rear end of which is spaced some distance from the rear end of the tubular member, that is, the right hand end as shown in the drawings, and the top surface of the tubular element is flattened on opposite sides of the slot, as shown at 13. The movable element is shown in the form of an elongate member or rod 14 which is slidably mounted in the bore or guideway 11 of the tubular member and which is provided with a longitudinal rib 15 which extends through the slot 12 in the tubular member and serves both to hold the movable member against rotation in the tubular member and to provide the movable member with a flat surface substantially in the plane of the flattened upper surface of the tubular member.

The stationary tubular member and the movable member are provided with means whereby the points of the divider may be easily and accurately positioned at predetermined points on the respective members. This positioning means may take various forms but preferably each positioning means comprises a recess adapted to receive a point of the divider. In the arrangement shown the stationary member is provided with a single recess 16 formed in the flat surface 13 adjacent the rear end of and in longitudinal alinement with the slot 12. The recess is preferably conical in form and the distance between recesses is measured from the apices of the cones, thus very accurately locating the points of the divider and at the same time permitting the points to be easily inserted in the recesses. The movable member may be provided with one or any desired number of such recesses. In the present instance, there are several of these recesses and they are formed in the rib 15 of the movable member. One such recess 17 is arranged close to the rear end of the rib so that when the movable member is in its fully retracted or normal position the recesses 16 and 17 will be spaced apart a short but exactly predetermined distance. The spacing may be measured in any suitable units of linear measurement and in the present instance the unit of measurement is inches, and the recesses 16 and 17 are exactly ⅛ of an inch apart when the movable member is at the rearward limit of its movement. In addition to the recess 17 the movable member is also provided with a longitudinal series of recesses 18 and 18' which are spaced one from the other exactly one inch and the rearmost recess of the series, 18', is spaced exactly one inch from the recess 16 in the stationary member.

Longitudinal movement may be imparted to the movable member in any suitable manner but preferably a rotatable actuating device is mounted on the rear portion of the stationary member and operatively connected with the movable member or rod. In the particular construction illustrated the actuating device is in the form of a sleeve 19 which extends about and has screw threaded connection with a slightly enlarged rear portion 20 of the stationary member. The forward end of the actuating sleeve is tapered and the opening therethrough is of such a diameter that the tapered portion fits snugly but movably about the body portion of the stationary member. The actuating device is rotatably connected with the movable member and is held against axial movement with relation thereto. It is preferable that the connection between the movable member and the actuating sleeve shall be adjustable in order to take up any lost motion which may develop, more particularly lost motion due to wear on the threads of the actuating device and the stationary member. For this purpose I have provided a connecting member 21 which is screw threaded into the rear end portion of the actuating device and has an axial bore to receive the reduced rear portion 22 of the movable member 14. The inner end of the connecting member abuts against the shoulder 23 formed on the movable member by reducing the diameter of the part 22 thereof and it is held in firm but rotatable contact with that shoulder by adjustable means. In the present instance, the reduced portion 22 of the movable member is provided with a radially tapered circumferential groove 24 and a stud 25 mounted in an opening in the wall of the connecting member has a tapered end which extends into the groove and engages the rear inclined wall thereof. The connecting member is provided with means, such as a kerf 26, to enable an implement to be applied thereto to rotate the same and thus change the relative positions of the actuating device and the movable member 14. Should there be substantial wear between the connecting member 21 and the shoulder 23 on the movable member this can be taken up by pressing the stud 25 inwardly until it has firm running contact with the wall of the groove. To do this the actuating device would be moved to its foremost position and the connecting member moved outwardly with relation to the actuating device far enough to permit access to the stud. When this has been done the connecting member is again adjusted with relation to the actuating device.

The stationary member 10 is provided with a longitudinal series of graduations, as shown at 27, over which the forward end of the actuating sleeve moves. The arrangement of the parts is such that when the movable member 14 is in its fully retracted position the forward edge of the actuating device will be at the zero graduation. In the present instance, the main graduations are calibrated in tenths of an inch and each tenth is subdivided into four parts, so that each subdivision is twenty-five thousandths of an inch. The tapered end of the actuating device is also provided with a series of graduations 28 calibrated in thousandths of an inch, there being twenty-five such graduations. The pitch of the threads which connect the actuating device with the stationary member is such that one complete rotation of the actuating device will advance the same, and the movable member, twenty-five thousandths of an inch. Thus any measurement which can be divided into twenty-five thousandths will be indicated by the graduation with which the forward end of the actuating device registers and any measurement which falls between the subdivisions of the graduations will be read upon the scale on the tapered end of the actuating device. When the micrometer is to be set for a measurement less than one inch it must be borne in mind that the positioning points or recesses, 16 and 17, are initially spaced an eighth of an inch apart and therefore that eighth of an inch, or one hundred and twenty-five thousandths, must be added to the reading on the scale 27. For example, if the recesses are to be spaced eight-tenths of an inch one from the other, that is, eight hundred thousandths, the reading on the scale 27 should be six hundred and seventy-five thousandths. The divider can be adjusted to any measurement in even inches by merely moving the movable member to its fully retracted position and then placing one point of the divider in the recess 16 on the stationary member and the other point in that one of the series of recesses in the movable member which represents the number of inches desired. When the measurement includes one or more whole inches plus a fraction of an inch, for example, two and three-tenths inches, the one point of the divider will be inserted in the recess 16 and the other point in the two inch recess 18 and the actuating device would then be operated to advance the movable member three-tenths of an inch, as indicated on the scale 27.

Several parts of the micrometer are of such a character that they may be very easily manufactured to fine tolerances and may be easily assembled. To assemble the separated parts the actuating sleeve 19 is slipped over the forward end of the tubular member 10 and moved rearwardly thereon until the threads thereon abut against the threads on the rear end of the tubular member. The movable member or rod 14 is then inserted through the forward end of the tubular member and moved to its rearmost position, that is, until the rib 15 contacts the rear end of the slot 12. In this position the rear end of the rod projects beyond the rear end of the tubular member and the adjusting member 21 can be mounted thereon and the retaining stud 25 inserted in the connecting member. The threads on the actuating sleeve are then brought into engagement with the threads on the tubular member and the sleeve is moved substantially to its rearmost position, thus permitting the connecting member to be screwed into the same, properly adjusted therein and secured in its adjusted position by a set screw 29. The forward end of the tubular member is then closed by a plug 30, which also forms a stop to limit the forward movement of the rod therein.

While I have shown and described one embodiment of my invention I wish it to be understood that I do not desire to be limited to the details thereof except as limited by the claims, as various modifications may occur to a person skilled in the art.

Having now fully described my invention, what

I claim as new and desire to secure by Letters Patent, is:

1. A micrometer comprising a normally stationary elongate member provided with a longitudinal guideway having an open portion the rear end of which is spaced from the rear end of said member, a second elongate member mounted in said guideway for longitudinal movement therein, said stationary member having adjacent the rear end of said open portion of and substantially in line with said guideway means for accurately positioning one arm of a divider at a point fixed with relation thereto, said movable member having means for accurately positioning the other arm of said divider at any one of a series of points thereon spaced equal distances one from the other lengthwise of said guideway, the rearmost positioning point of said series being spaced from the positioning point of said stationary member a distance equal to the distance between adjacent positioning points of said series when said movable member is in its rearmost position, said stationary member having a longitudinal series of graduations, and a device for actuating said movable member mounted on the rear end portion of said stationary member for movement lengthwise thereof and having a part movable along said series of graduations to indicate the distance said movable member is moved by said actuating device.

2. A micrometer comprising a normally stationary elongate member provided with a longitudinal guideway having an open portion the rear end of which is spaced from the rear end of said member, a second elongate member mounted in said guideway for longitudinal movement therein, said stationary member having adjacent the rear end of said open portion of and substantially in line with said guideway means for accurately positioning one arm of a divider at a point fixed with relation thereto, said movable member having means for accurately positioning the other arm of said divider at any one of a series of points thereon spaced equal distances one from the other lengthwise of said guideway, the rearmost positioning point of said series being spaced from the positioning point of said stationary member a distance equal to the distance between adjacent positioning points of said series when said movable member is in its rearmost position, said movable member also having means for positioning the last mentioned arm of said divider at a point thereon normally spaced from the positioning means on said stationary member a distance less than the distance between adjacent points of said series of points, a device for actuating said movable member mounted on the rear end portion of said stationary member for movement lengthwise thereof, and means for indicating the distance said movable member is moved by said actuating device.

3. A micrometer comprising an elongate tubular member having a longitudinal slot in one side thereof, a rod mounted in said tubular member for longitudinal movement with relation thereto, an actuating device movably supported on said tubular member and connected with said rod to adjust the latter in said guideway, said tubular member having adjacent the rear end of said slot a recess to receive and accurately position one point of a divider, said rod having in that surface thereof adjacent said slot a recess to receive and accurately position the other point of said divider, and means for indicating the distance between said recesses in all adjusted positions of said rod, said rod also having other similar recesses spaced longitudinally thereof predetermined distances one from the other and from the first mentioned recess in said rod.

4. A micrometer comprising an elongate tubular member having a longitudinal slot in one side thereof, a rod mounted in said tubular member for longitudinal movement with relation thereto, an actuating device movably supported on the rear portion of said tubular member and connected with said rod to adjust the latter in said guideway, said tubular member having adjacent the rear end of said slot a recess to receive and accurately position one point of a divider, and said rod having in said surface thereof adjacent said slot a longitudinal series of recesses spaced equal distances one from the other, and each adapted to receive and accurately position the other point of said divider, the rearmost recess of said series being normally spaced from the recess in said tubular member the same distance that the recesses of said series are spaced one from the other, said rod also having a similar recess spaced from said recess in said tubular member a distance materially less than the distance between adjacent recesses of said series.

5. A micrometer comprising an elongate tubular member having in one side thereof a longitudinal slot the rear end of which is spaced from the rear end of said member, an elongate member movably mounted in said tubular member for longitudinal adjustment therein, held against rotation with relation thereto and extending rearwardly beyond said slot, said members having longitudinally aligned recesses to receive the respective points of a divider and accurately position the same with relation thereto, an actuating device rotatably mounted on said tubular member in the rear of said slot to adjust said movable member, and means for indicating the distance between said recesses in adjusted positions of said movable member.

6. A micrometer comprising an elongate tubular member having a flat surface on one side thereof, and a longitudinal slot extending through said flat surface, the rear end of said slot being spaced from the rear end of said member, an elongate member slidably mounted in said tubular member, extending rearwardly beyond said slot and having a longitudinal part extending into said slot, said tubular member and said longitudinal part of said slidable member having longitudinally aligned recesses to receive the respective points of a divider and accurately position the same with relation thereto, and a rotatable actuating device mounted on and having screw threaded connection with the rear end portion of said tubular member and connected with said slidable member to impart longitudinal movement to the latter, said tubular member having a longitudinal series of graduations over which the forward end of said actuating member moves.

7. A micrometer comprising a normally stationary elongate member having a longitudinal guideway, an elongate member slidably mounted in said guideway, held against rotation therein and extending rearwardly beyond said guideway, said members having means whereby the respective points of a divider may be accurately positioned at predetermined points thereon, a rotatable sleeve mounted on and having screw threaded connection with the rear portion of said stationary member, a connecting member mounted in said sleeve for axial adjustment therein, held normally against such adjustment and having an axial bore, said slidable member having a rear end portion of reduced diameter extending into said bore and forming on said slidable member a shoulder against which said connecting member abuts, said reduced portion having a tapered circumferential groove, an adjustable part carried by said connecting member and engaging one wall of said tapered groove to hold said connecting member in firm rotatable contact with said shoulder, and means for indicating the distance between said positioning points in all operative positions of said elongate members.

FRANK E. ZEHRING.

REFERENCES CITED

The following references are of record in the file of this patent:

UNITED STATES PATENTS

| Number | Name | Date |
| --- | --- | --- |
| 452,054 | Sperry | May 12, 1891 |
| 695,661 | Theibault | Mar. 18, 1902 |
| 827,443 | Henrikson | July 31, 1906 |
| 1,142,436 | Joha | June 8, 1915 |
| 1,952,190 | Wells | Mar. 27, 1934 |
| 2,241,692 | Williams | May 13, 1941 |
| 2,402,778 | Rottler | June 25, 1946 |